(12) United States Patent
Washiro (10) Patent No.: US 8,498,571 B2
(45) Date of Patent: Jul. 30, 2013

(54) COMMUNICATION DEVICE

(75) Inventor: Takanori Washiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 223 days.

(21) Appl. No.: 13/044,779

(22) Filed: Mar. 10, 2011

(65) Prior Publication Data

US 2011/0230136 A1    Sep. 22, 2011

(30) Foreign Application Priority Data

Mar. 18, 2010   (JP) ................................. 2010-063052

(51) Int. Cl.
   *H04B 5/00*      (2006.01)
(52) U.S. Cl.
   USPC ........ 455/41.1; 455/41.2; 455/41.3; 343/702; 343/762
(58) Field of Classification Search
   USPC ......... 455/41.1, 41.2, 41.3, 81, 225; 343/702, 343/762, 771, 850, 852, 853
   See application file for complete search history.

(56) References Cited

U.S. PATENT DOCUMENTS

| 7,076,216 B2 * | 7/2006 | Hayashi | ......................... 455/78 |
| 7,750,851 B2 * | 7/2010 | Washiro | ................. 343/700 MS |

FOREIGN PATENT DOCUMENTS

JP    4345849    7/2009

OTHER PUBLICATIONS www.transferjet.org/index.html, 2009 Copyright Transfer Jet Consortium.

* cited by examiner

*Primary Examiner* — Tuan H Nguyen
(74) *Attorney, Agent, or Firm* — Sony Corporation (57) ABSTRACT

A communication device includes a communication circuit unit that processes a high frequency signal which transmits data, a high frequency signal transmission path that is connected to the communication circuit unit, a high frequency coupler that receives the high frequency signal and radiates an induction electric field signal of a longitudinal wave, and an antenna that receives the high frequency signal and radiates a radiation electromagnetic field or an electric wave signal of a transverse wave.

18 Claims, 9 Drawing Sheets

COMMUNICATION DEVICE

BACKGROUND OF THE INVENTION

1. Field of the Invention

The present invention relates to a communication device which transmits a large volume of data in a proximate distance through a weak UWB communication method using a high frequency broadband, and more particularly to a communication device which employs a weak UWB communication using an electric field coupling and secures a communicationable range in the transverse direction.

2. Description of the Related Art

A noncontact communication method has been widely used as a medium for authentication information or other value information such as electronic money. Also, in recent years, examples of new applications of a noncontact communication system include a large volume data transmission such as downloading or streaming of video, music, or the like. The large volume data transmission is completed by a single user as well, further is preferably completed with the same sense of access time as the authentication and billing process in the related art, and thus it is necessary to increase the communication rate.

A general RFID specification uses the 13.56 MHz band and is a proximity type (from 0 to 10 cm) noncontact bidirectional communication which employs electromagnetic induction as a main principle, but the communication rate is only 106 kbps to 424 kbps. In contrast, as a proximity wireless transmission technique applicable to high speed communication, there is TransferJet (for example, see Japanese Patent No. 4345849 and www.transferjet.org/en/index.html (searched on Mar. 2, 2010). This proximity wireless transmission technique (TransferJet) employs a method of transmitting signals using an electric field coupling action, wherein a high frequency coupler of the communication device includes a communication circuit unit which processes high frequency signals, a coupling electrode which is disposed spaced apart from a ground with a certain height, and a resonance unit which effectively supplies high frequency signals to the coupling electrode.

A proximity wireless transmission using a weak UWB employs a fundamental principle which mainly uses a longitudinal wave component $E_R$ which does not include a radiation electric field in an electric field generated by a coupling electrode (described later), has a communication distance of 2 to 3 cm, does not have a polarized wave, has almost the same area in the longitudinal direction and the transverse direction, and has a communicationable range of nearly hemispherical shape. For this reason, between communication devices which perform data transmission, it is necessary to appropriately face coupling electrodes to each other and to cause a sufficient electric field coupling to act on each other.

If the proximity wireless transmission function is manufactured in a small size, it is suitable for built-in use, and, for example, it can be mounted in a variety of information devices such as a personal computer or a portable telephone. However, if the coupling electrode of the high frequency coupler is reduced in size, particularly, there is a problem in that the communicationable range in the transverse direction decreases. For example, if a target point mark indicating a part where the high frequency coupler is implanted is added onto a surface of a case of an information device, it is convenient for a user to adjust the position targeting the target point. However, in a case where the communicationable range in the transverse direction is narrow, when the devices come close to each other, there are some cases where the target point is hidden in shadow, shifted from the center position in the transverse direction and touched.

In order to heighten the practical use of the proximity wireless transmission function, it is necessary to expand the communicationable range in the transverse direction. However, if the size of the coupling electrode of the high frequency coupler is simply increased, a standing wave is generated on the surface of the coupling electrode. Further, in a part where the amplitude of the standing wave is reversed, charges having different polarity are distributed, and the neighboring charges having the different polarities mutually cancel the electric fields of each other, and thereby a place where the field intensity is strong and a place where the field intensity is weak are generated. The place where the field intensity is weak becomes a insensitive point (null point) in which it is difficult to obtain a good electric field coupling action even if a coupling electrode of a communication partner comes close thereto.

On the other hand, according to an electric wave communication method using radiation electric field, the communicationable range can be greatly expanded. However, there is no sharp operability for specifying a communication partner in an act of a device coming close to a target point. In addition, it is necessary to take into consideration the preventing hacking or of securing confidentiality on a transmission path.

SUMMARY OF THE INVENTION

It is desirable to provide an excellent communication device capable of transmitting a large volume of data at a proximate distance by a weak UWB communication method using a high frequency broadband.

It is also desirable to provide excellent high frequency coupler and communication device which employ a proximity wireless transmission having no polarized wave using a weak UWB and can secure a sufficient communicationable range in the transverse direction.

According to an embodiment of the present invention, there is provided a communication device including a communication circuit unit that processes a high frequency signal which transmits data; a high frequency signal transmission path that is connected to the communication circuit unit; a high frequency coupler that receives the high frequency signal and radiates an induction electric field signal of a longitudinal wave; and an antenna that receives the high frequency signal and radiates a radiation electromagnetic field or an electric wave signal of a transverse wave. The high frequency coupler according to an embodiment of the present invention includes a coupling electrode that is connected to one end of the transmission path and accumulates a charge; a ground that is disposed to face the coupling electrode and accumulates a reflected image charge of the charge; a resonance unit that increases the current flowing into the coupling electrode by installing the coupling electrode at a part where the voltage amplitude of a standing wave generated when the high frequency signal is supplied becomes great; and a support unit that is constituted by a metal line connected to the resonance unit at a nearly central position of the coupling electrode, wherein a microscopic dipole formed by a line segment connecting a center of the charge accumulated in the coupling electrode to a center of the reflected image charge accumulated in the ground is formed, and wherein the induction electric field signal of the longitudinal wave is output towards a coupling electrode of a communication partner side which is disposed to face the coupling electrode such that an angle θ formed in the direction of the microscopic dipole becomes nearly 0 degrees.

The high frequency coupler according to an embodiment of the present invention mainly radiates the induction electric field signal of the longitudinal wave in a front side direction of the coupling electrode, and the antenna is disposed such that the radiation electromagnetic field or the electric wave signal of the transverse wave expands the communicationable range of the high frequency coupler in the transverse direction.

In the transmission path, the total phase length of a signal for each path may be adjusted such that a path for the induction electric field signal of the longitudinal wave and a path for the radiation electromagnetic field or the electric wave signal of the transverse wave radiated from the antenna are in phase.

The communication device according to an embodiment of the present invention further includes a switch that selectively connects the transmission path for the high frequency signal to either the high frequency coupler or the antenna, wherein a switch diversity is performed by connection to one having a better transmission state of the high frequency coupler and the antenna.

The antenna according to an embodiment of the present invention is formed by a metal line of a support unit having a length for radiating the radiation electromagnetic field or the electric wave signal.

The antenna according to an embodiment of the present invention is formed by a metal piece which is installed in the direction of the induction electric field radiated by the coupling electrode.

The metal piece according to an embodiment of the present invention is formed to have a linear shape with a length of half a wavelength or a length of the half-integer multiple of the wavelength and itself resonates independently as an antenna.

The metal piece according to an embodiment of the present invention is formed to have a loop shape with a length of one wavelength or the integral multiple of the wavelength and itself resonates independently as an antenna.

The metal piece according to an embodiment of the present invention is installed at a place where a strong induction electric field radiated from the coupling electrode reaches a part where an amplitude of a voltage when the metal piece resonates becomes maximal.

According to the present invention, it is possible to provide an excellent communication device capable of transmitting a large volume of data at a proximate distance by a weak UWB communication method using a high frequency broadband.

According to the present invention, it is possible to provide an excellent communication device which employs a proximity wireless transmission having no polarized wave using a weak UWB and can secure a sufficient communicationable range in the transverse direction.

According to the present invention, the communication device is configured by combining the high frequency coupler which radiates the induction electric field signal of the longitudinal wave and the antenna which radiates the radiation electromagnetic field or the electric wave signal of the transverse wave, and thereby it is possible to obtain a communicationable range which is suitable for a user to adjust a position targeting a target point and which is expanded in the transverse direction. The communication device according to an embodiment of the present invention can realize not only a sharp operability where communication is stabilized around the target point and usability with no polarized waves (that is, dependency on the direction of an antenna) but also convenient proximity wireless transmission by alleviating accuracy of alignment which targets the target point due to the communicationable range expanded in the transverse direction.

According to the present invention, through the combination of the antenna used for distant places, the communicationable range of the high frequency coupler used for proximate places is expanded in the transverse direction, and thereby, for example, when information devices in which the high frequency couplers are built face each other, it is possible to perform stable communication even if a user does not accurately make the target point marks come close to each other.

According to the present invention, although the signals are mixed in an area where the extent of the induction electric field radiated from the high frequency coupler and the extent of the radiation electromagnetic field overlap each other, since the total phase length of a signal for each path is adjusted, there is no case where the signals balance due to interference with each other.

According to the present invention, since a switch diversity is performed by connection to the one having the better transmission state of the high frequency coupler and the antenna, a signal is radiated from either the high frequency coupler or the antenna. Therefore, the signals are not mixed with each other and interference can be prevented.

According to the present invention, the antenna may be formed by a metal line supporting the coupling electrode and having a length for radiating the radiation electromagnetic field or the electric wave signal of a transverse wave. Therefore, a single high frequency coupler has combined functions of radiating an induction electric field signal of a longitudinal wave and radiating a radiation electromagnetic field or an electric wave signal, and thus the antenna used for distant places and the high frequency coupler used for proximate places can be integrated in a single module.

According to the present invention, since the metal piece which is installed in the direction of the induction electric field radiated by the coupling electrode works as an antenna, the antenna used for distant places and the high frequency coupler used for proximate places can be integrated in a single module. It is possible to increase the coupling intensity by receiving the induction electric field radiated from the coupling electrode and reradiating an electric wave.

According to the present invention, since the metal piece has a size leading to resonance, the metal piece itself can work (resonate) single as a radiation element of an antenna.

According to the present invention, since a strong induction electric field radiated from the coupling electrode reaches a part where an amplitude of a voltage when the metal piece resonates becomes maximal, it is possible to induce a current inside the metal piece.

Other purposes, features or advantages of the present invention will become apparent through more detailed description based on embodiments of the present invention or the accompanying drawings.

DESCRIPTION OF THE PREFERRED EMBODIMENTS

Hereinafter, embodiments of the present invention will be described with reference to the accompanying drawings.

Figure 1:
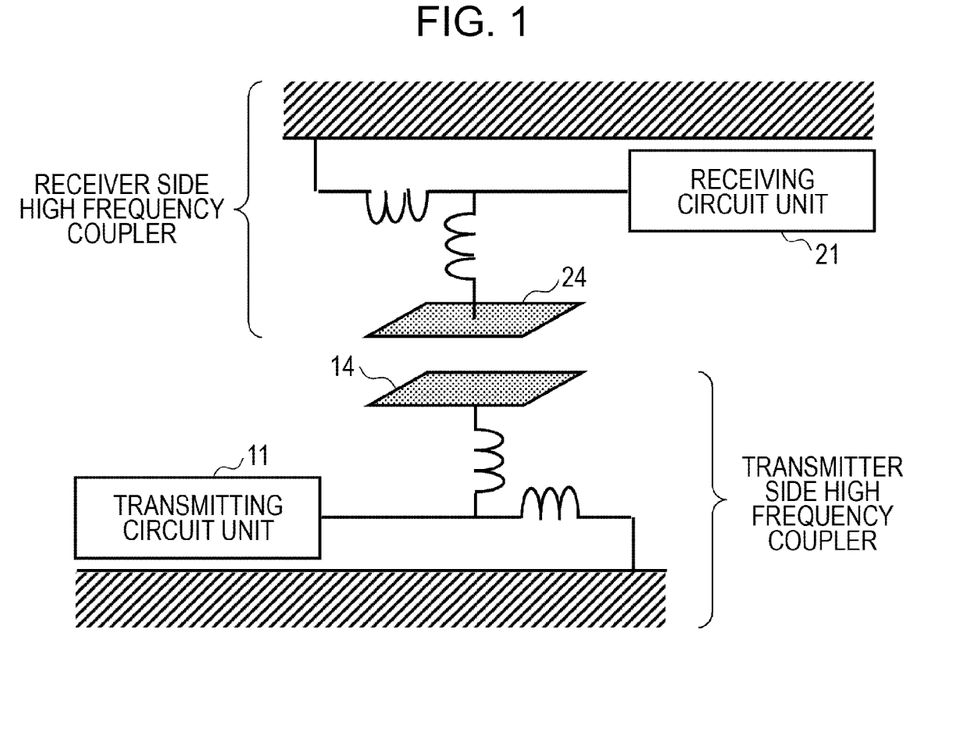
FIG. 1 is a schematic diagram illustrating a configuration of a proximity wireless transmission system by a weak UWB communication method.

FIG. 1 schematically shows a configuration of a proximity wireless transmission system by a weak UWB communication method using an electric field coupling action. In the figure, coupling electrodes 14 and 24 which are used for transmission and reception are respectively included in a transmitter 10 and a receiver 20 are disposed facing each other with a gap of, for example, about 3 cm (or about half the wavelength in the frequency band which is used) and realize an electric field coupling. If receiving a transmission request from a higher rank application, a transmitting circuit unit 11 of the transmitter side generates a high frequency transmitted signal such as a UWB signal based on the transmitted data, and the generated signal is propagated from the transmitting electrode 14 to the receiving electrode 24 as an electric field signal. A receiving circuit unit 21 of the receiver 20 demodulates and decodes the received high frequency electric field signal and sends the reproduced data to the higher rank application.

If the UWB is used in the proximity wireless transmission, it is possible to realize an ultra-high speed data transmission of about 100 Mbps. Also, in the proximity wireless transmission, as described later, instead of the radiation electric field, an electrostatic field or an induction electric field coupling action is used. Since the field intensity is inversely proportional to the cube or the square of a distance, the field intensity within a distance of 3 meters from wireless equipment is limited to a predetermined level or less, and thus the proximity wireless transmission system can perform weak wireless communication which is unnecessary for licensing of radio stations. Therefore, the proximity wireless transmission system can be configured at a low cost. Also, since data communication is performed by the electric field coupling method in the proximity wireless transmission, there are advantages in that the number of reflected waves from peripheral reflection objects is small, thus there is little influence from interference, and it is unnecessary to take into consideration of the prevention of hacking or of securing confidentiality on a transmission path.

In the wireless communication, a propagation loss increases in proportion to the propagation distance with respect to a wavelength. In the proximity wireless transmission using the high frequency broadband signal like in the UWB signal, the communication distance of about 3 cm corresponds to about half the wavelength. In other words, the communication distance may not be disregarded even if it is proximate, and it is necessary to suppress the propagation loss to a sufficiently low degree. Particularly, the characteristic impedance problem is more serious in the high frequency circuit than in the low frequency circuit, and thus the influence of the impedance mismatching in the coupling point between the electrodes of the transmitter and the receiver is manifested.

For example, in the proximity wireless transmission system shown in FIG. 1, even when the transmission path for the high frequency electric field signal connecting the transmitting circuit unit 11 to the transmitting electrode 14 is a coaxial line having an impedance matching of, for example, 50Ω, if the impedance in the coupling portion between the transmitting electrode 14 and the receiving electrode 24 is mismatched, the electric field signal is reflected and thus the propagation loss occurs. Thereby, communication efficiency is lowered.

Figure 2:
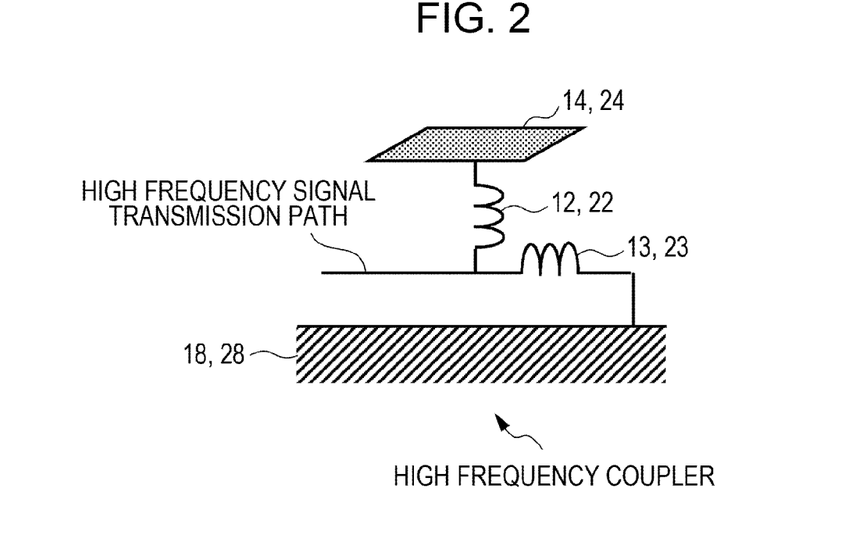
FIG. 2 is a diagram illustrating a basic configuration of a high frequency coupler which is respectively disposed in a transmitter and a receiver.

Therefore, as shown in FIG. 2, the high frequency couplers which are respectively included in the transmitter 10 and the receiver 20 are connected to the high frequency signal transmission path via resonance units respectively including the plate-shaped electrodes 14 and 24, serial inductors 12 and 22, and parallel inductor 13 and 23. The high frequency signal transmission path described here may include a coaxial cable, a microstrip line, a coplanar line, and the like. If the high frequency couplers are disposed to face each other, the coupling portion works as a bandpass filter at a very proximate distance where a quasi-electrostatic field is dominant and thus can transmit a high frequency signal. In addition, even at a distance where the induction electric field is dominant and which may not be disregarded with respect to the wavelength, the high frequency signal can be effectively transmitted between the two high frequency couplers via the induction electric field generated from a microscopic dipole (described later) formed by charges and reflected image charges which respectively gather in the coupling electrode and the ground.

Here, between the transmitter 10 and the receiver 20, that is, in the coupling portion, if it is a purpose only to pick the impedance matching and suppress the reflected waves, even using a simple structure in which the plate-shaped electrodes 14 and 24 and the serial inductors 12 and 22 are connected in series on the high frequency signal transmission path for each coupler, it is possible to make a design such that impedance in the coupling portion is consecutive. However, there is no variation in the characteristic impedance before and after the coupling portion, and thus the magnitude of the current does not vary. In contrast, the installation of the parallel inductors 13 and 23 causes greater charges to be sent to the coupling electrode 14 and a strong electric field coupling action to be generated between the coupling electrodes 14 and 24. When a large electric field is induced around the surface of the coupling electrode 14, the generated electric field is a longitudinal wave electric field signal oscillating in a progress direction (direction of the microscopic dipole: described later) and propagates from the surface of the coupling electrode 14. Due to this electric field wave, even when the distance (phase length) between the coupling electrodes 14 and 24 is relatively large, the electric field signal can be propagated.

In summary of the above description, in the proximity wireless transmission system by the weak UWB communication method, conditions which the high frequency coupler has are as follows.

(1) There are coupling electrodes, facing a ground, to be coupled by an electric field, which are spaced apart from each other with a height which can be disregarded with respect to the wavelength of a high frequency signal.

(2) There are resonance units for coupling by a stronger electric field.

(3) In a frequency band used in communication, when coupling electrodes are disposed to face each other, a constant of a capacitor or a length of a stub is set by serial and parallel inductors and the coupling electrodes so as to pick the impedance matching.

If compensating for the above-described condition (1), a height from the ground of the high frequency coupler to the coupling electrode is designed to be a twentieth or less the wavelength. As the height of the coupling electrode increases, that is, the metal line connecting the coupling electrode and the resonance unit is lengthened, electric waves radiated from the metal line in a horizontal direction increase.

In the proximity wireless transmission system shown in FIG. 1, if the coupling electrodes 14 and 24 of the transmitter 10 and the receiver 20 face each other with an appropriate distance, the two high frequency couplers work as a bandpass filter which allows an electric field signal in a desired high frequency band to be passed, a single high frequency coupler works as an impedance conversion circuit which amplifies a current, and a current having a large amplitude flows to the coupling electrode. On the other hand, when the high frequency coupler lies independently in a free space, since the input impedance of the high frequency coupler does not match the characteristic impedance of the high frequency signal transmission path, a signal entering the high frequency signal transmission path is reflected inside the high frequency coupler and is not radiated outwards, and thus there is no effect on other communication systems present in the vicinity thereof. That is to say, the transmitter side does not release the electric wave when a communication partner does not exist, unlike the antenna in the related art, and the impedance matching disappears only when a communication partner comes close to the transmitter side, thereby transmitting a high frequency high frequency signal.

Figure 3:
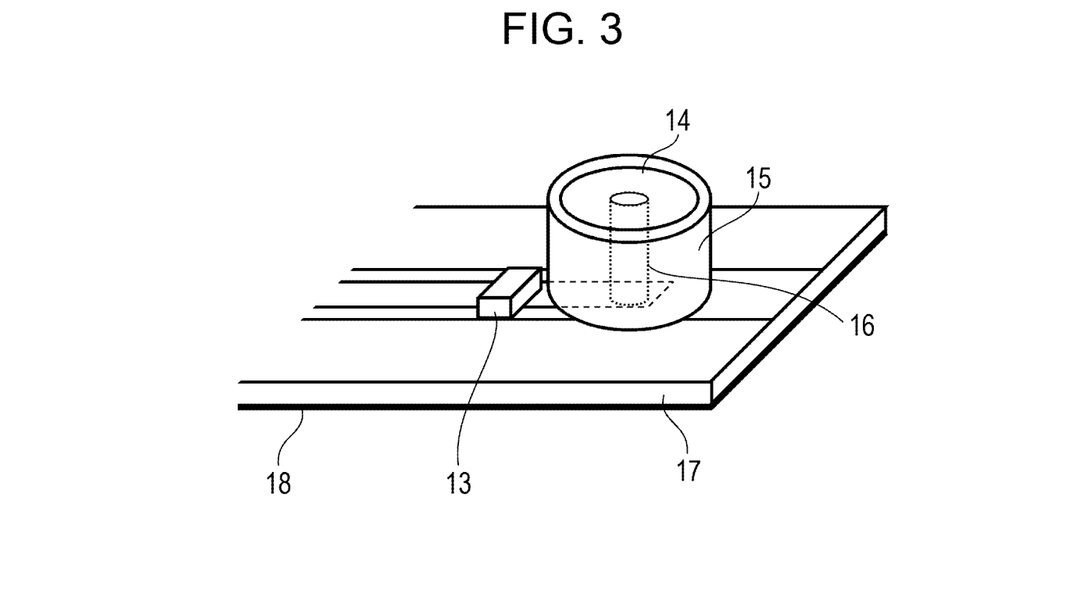
FIG. 3 is a diagram illustrating an example where the high frequency coupler shown in FIG. 2 is installed.

FIG. 3 shows an example where the high frequency coupler shown in FIG. 2 is installed. Any high frequency coupler of the transmitter 10 and the receiver 20 may be configured in the same manner. In the same figure, the coupling electrode 14 is installed on a spacer 15 constituted by a dielectric and is electrically connected to the high frequency signal transmission path on a print board 17 via a through-hole 16 which penetrates the spacer 15. In the same figure, the spacer 15 has a roughly pillar shape, and the coupling electrode 14 has a roughly circular shape, but these are not limited to having a specific shape.

For example, after the through-hole 16 is formed in a dielectric with a desired height, the through-hole 16 is filled with a conductor, and a conductor pattern which will be the coupling electrode 14 is deposited on the upper end surface of the dielectric by, for example, a plating technique. A wire pattern which is the high frequency signal transmission path is formed on the print board 17. The spacer 15 is installed on the print board 17 by a reflow soldering or the like, and thereby the high frequency coupler can be manufactured. The height from the surface (or the ground 18) with circuits of the print circuit 17 to the coupling electrode 14, that is, the length of the through-hole 16 is appropriately adjusted according to a wavelength which is used, and thereby the through-hole 16 has inductance and thus can replace the serial inductor 12 shown in FIG. 2. In addition, the high frequency signal transmission path is connected to the ground 18 via the chip-shaped parallel inductor 13.

Here, the electromagnetic field generated from the coupling electrode 14 of the transmitter 10 side will be observed.

As shown in FIGS. 1 and 2, the coupling electrode 14, connected to one end of the high frequency signal transmission path, into which a high frequency signal output from the transmitting circuit unit 11 flows, accumulates charges therein. At this time, by the resonance action in the resonance unit constituted by the serial inductor 12 and the parallel inductor 13, a current flowing into the coupling electrode 14 via the transmission path is amplified and greater charges are accumulated.

The ground 18 is disposed to face the coupling electrode 14 with a gap of a height which can be disregarded with respect to a wavelength of the high frequency signal. As described above, if the charges are accumulated in the coupling electrode 14, reflected image charges are accumulated in the ground 18. If a point charge Q is placed outside a planar conductor, a reflected image charge −Q (which virtually replaces the surface charge distribution) is disposed inside the planar conductor, which is known in the art, as disclosed in "Electromagnetics" (SHOKABO PUBLISHING Co., Ltd., page 54 to page 57) written by Tadashi Mizoguchi.

As described above, as a result of the point charge Q and the reflected image charge −Q being accumulated, a microscopic dipole formed by a line segment connecting a center of the charges accumulated in the coupling electrode 14 to a center of the reflected image charge accumulated in the ground 18 is formed. Strictly speaking, the charge Q and the reflected image charge −Q have a volume, and the microscopic dipole is formed so as to connect the center of the charge to the center of the reflected image charge. The "microscopic dipole" described here means that "the distance between the charges of the electric dipole is very short." For example, the "microscopic dipole" is also disclosed in "Antenna and electric wave propagation (CORONA PUBLISHING CO., LTD. pages 16 to 18) written by Yasuto Mushiake." Further, the microscopic dipole generates a transverse wave component $E_\theta$ of the electric field, a longitudinal wave component $E_R$ of the electric field, and a magnetic field $H_\phi$ around the microscopic dipole.

Figure 4:
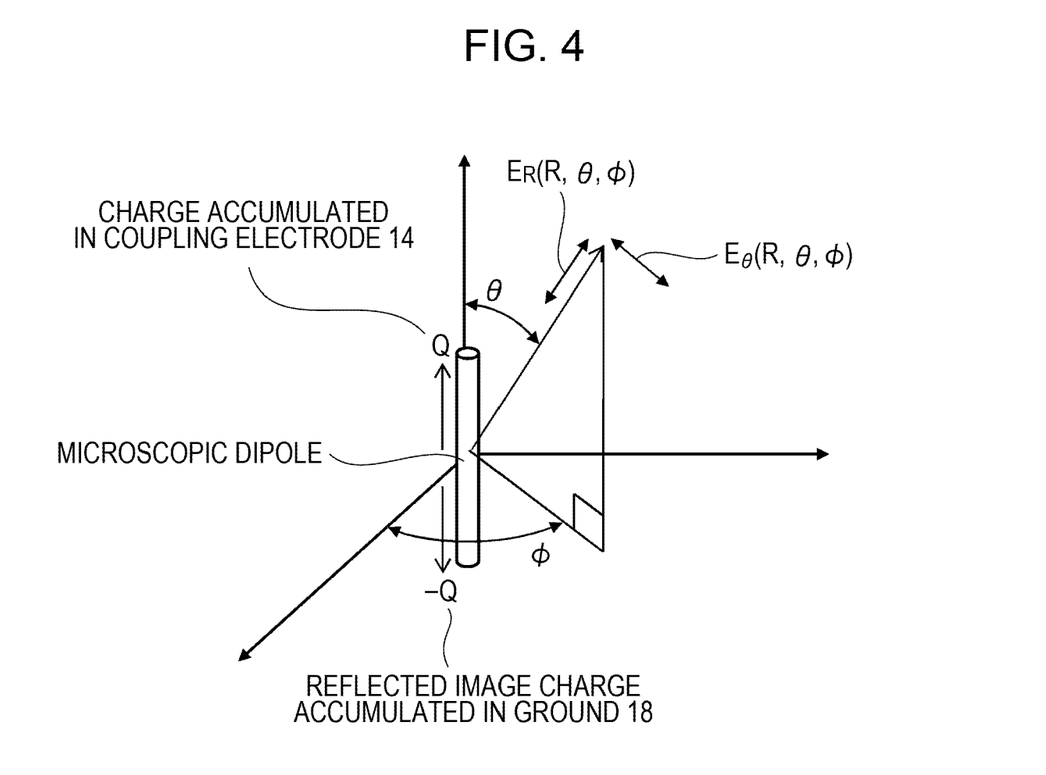
FIG. 4 is a diagram illustrating an electric field by a microscopic dipole.
Figure 5:
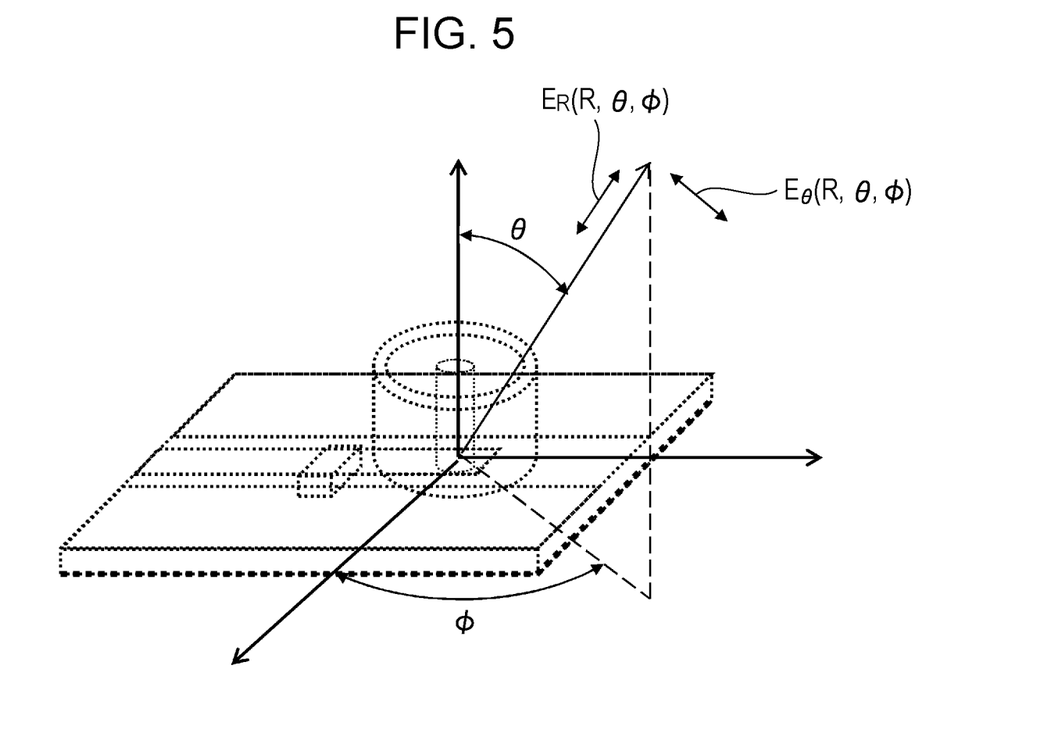
FIG. 5 is a diagram illustrating mapping the electric field shown in FIG. 4 onto the coupling electrode.

FIG. 4 shows the electric field generated by the microscopic dipole. Also, FIG. 5 shows a state where the electric field is mapped on the coupling electrode. As shown in the figures, the transverse wave component $E_\theta$ of the electric field oscillates in a direction perpendicular to the propagation direction, and the longitudinal wave component $E_R$ of the electric field oscillates in a direction parallel to the propagation direction. The magnetic field $H_\phi$ is generated around the microscopic dipole. The following equations (1) to (3) indicate electromagnetic field generated by the microscopic dipole. In the same equations, the component inversely proportional to the cube of the distance R indicates a static electromagnetic field, the component inversely proportional to the square of the distance R indicates an induction electromagnetic field, and the component inversely proportional to the distance R indicates a radiation electromagnetic field.

$$E_\theta = \frac{pe^{-jkR}}{4\pi\varepsilon}\left(\frac{1}{R^3} + \frac{jk}{R^2} - \frac{k^2}{R}\right)\sin\theta \quad (1)$$

$$E_R = \frac{pe^{-jkR}}{2\pi\varepsilon}\left(\frac{1}{R^3} + \frac{jk}{R^2}\right)\cos\theta \quad (2)$$

$$H_\phi = \frac{j\omega pe^{-jkR}}{4\pi}\left(\frac{1}{R^2} + \frac{jk}{R}\right)\sin\theta \quad (3)$$

In the proximity wireless transmission system shown in FIG. 1, in order to suppress a wave interfering with peripheral systems, it is preferable that the transverse wave component $E_\theta$ including a radiation electric field component is suppressed and the longitudinal wave component $E_R$ not including the radiation electric field component is used. This is because as can be seen from the equations (1) and (2), the transverse wave component $E_\theta$ of the electric field includes the radiation electric field which is inversely proportional to the distance (that is, small distance attenuation), whereas the longitudinal wave component $E_R$ does not include the radiation electric field.

Figure 6:
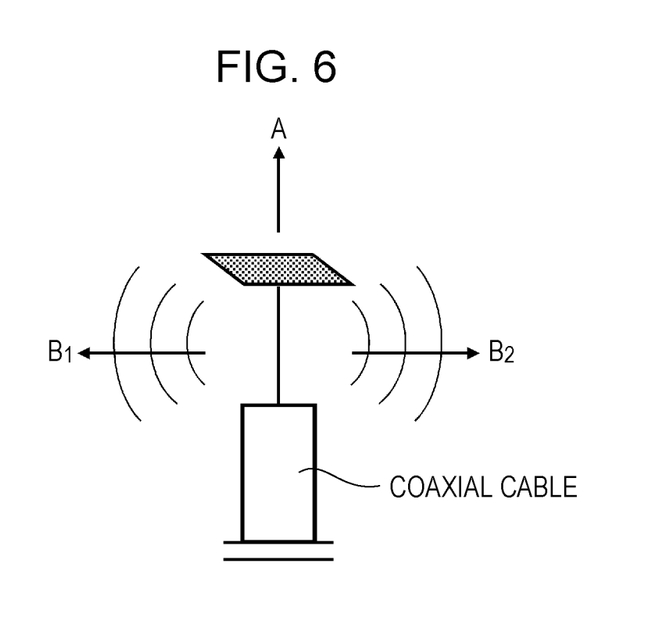
FIG. 6 is a diagram illustrating a configuration example of a capacity loaded antenna.

First of all, in order to generate the transverse wave component $E_\theta$ of the electric field, it is necessary for the high frequency coupler not to work as an antenna. At a glance, the high frequency coupler shown in FIG. 2 has a structure similar to a "capacity loaded antenna" in which a metal is provided at the front end of the antenna element to have capacitance and to decrease the height of the antenna. Therefore, it is necessary for the high frequency coupler not to work as the capacity loaded antenna. FIG. 6 shows a configuration example of the capacity loaded antenna, and in the same figure, the longitudinal wave component $E_R$ of the electric field is mainly generated in the direction of the arrow A, and the transverse wave component $E_\theta$ of the electric field is generated in the directions of the arrows $B_1$ and $B_2$.

In the configuration example of the coupling electrode shown in FIG. 3, the dielectric 15 and the through-hole 16 have combined functions of preventing coupling of the coupling electrode 14 and the ground 18 and forming the serial inductor 12. The serial inductor 12 is formed by selecting a sufficient height from the circuit mounted surface of the print circuit 17 to the electrode 14, the electric field coupling between the ground 18 and the electrode 14 is prevented and the electric field coupling with the high frequency coupler of the receiver side is secured. However, if the height of the dielectric 15 is great, that is, the distance between the circuit mounted surface of the print circuit 17 to the electrode 14 reaches a length which may not be disregarded with respect to the wavelength which is used, the high frequency coupler works as the capacity loaded antenna, and thus the transverse wave component $E_\theta$ as indicated by the arrows $B_1$ and $B_2$ in FIG. 6 is generated. Therefore, the height of the dielectric 15 follows a condition of a sufficient length for obtaining characteristics as the high frequency coupler by preventing the coupling between the electrode 14 and the ground 18 and for forming the serial inductor 12 used to work as an impedance matching circuit and a small length for suppressing radiation of the unnecessary electric wave $E_\theta$ caused by a current flowing into the serial inductor 12.

On the other hand, from the above equation (2), it can be seen that the longitudinal wave component $E_R$ becomes maximal at the angle $\theta=0$ formed in the direction of the microscopic dipole. Therefore, in order to perform the noncontact communication through the effective use of the longitudinal wave component $E_R$ of the electric field, it is preferable that a high frequency coupler of a communication partner is disposed to face such that the angle $\theta$ formed in the direction of the microscopic dipole nearly becomes 0 degree, and a high frequency electric field signal is transmitted.

Further, the current of the high frequency signal flowing into the coupling electrode 14 can be made to be greater by the resonance unit including the serial inductor 12 and the parallel inductor 13. As a result, the moment of the microscopic dipole formed by the charge accumulated in the coupling electrode 14 and the reflected image charge in the ground side can be made to be large, and the high frequency electric field signal constituted by the longitudinal wave component $E_R$ can be efficiently transmitted towards the propagation direction where the angle $\theta$ formed in the direction of the microscopic dipole nearly becomes 0 degrees.

In the impedance matching unit of the high frequency coupler shown in FIG. 2, an operation frequency $f_0$ is determined based on constants $L_1$ and $L_2$ of the parallel inductor and the serial inductor. However, in a high frequency circuit, it is known that a lumped-constant circuit has a band narrower than a distributed constant circuit, and the constant of an inductor decreases as a frequency is heightened. Thus, there is a problem in that the resonant frequency deviates due to a difference in the constants. In contrast, the impedance matching unit or the resonance unit constitutes the high frequency coupler using the distributed constant circuit instead of the lumped-constant circuit, thereby realizing broadband.

Figure 7:
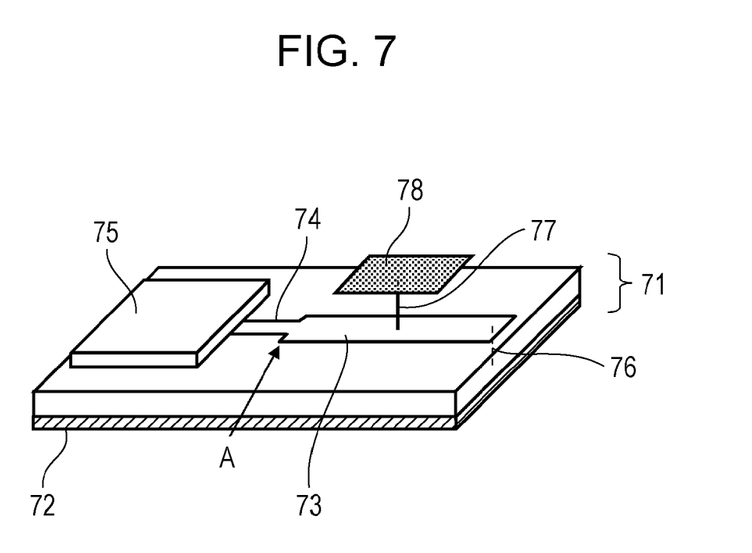
FIG. 7 is a diagram illustrating a configuration example of the high frequency coupler in which a distributed constant circuit is used in a resonance unit.

FIG. 7 shows a configuration example of the high frequency coupler using the distributed constant circuit in the matching unit or the resonance unit. In the example shown in the figure, a ground conductor 72 is formed on the bottom, and a high frequency coupler is installed on a print board 71 on which a print pattern is formed. As an impedance matching unit and a resonance unit of the high frequency coupler, instead of the parallel inductor and the serial inductor, a microstrip line or a coplanar waveguide, that is, a stub 73, which works as a distributed constant circuit, is formed, and is connected to a transmitting and receiving circuit module 75 via a signal line pattern 74. The stub 73 of which the front end is connected to the ground 72 on the bottom via a through-hole 76 penetrating the print board 71 forms a short circuit. The vicinity of the center of the stub 73 is connected to the coupling electrode 78 via a single terminal 77 constituted by a thin metal line.

A "stub" mentioned in the technical field of electronics generally refers to an electric wire of which one end is connected to an element and the other end is not connected thereto or is connected to a ground, which is provided in the middle of a circuit, and is used for adjustment, measurement, impedance matching, filters, or the like.

Figure 8:
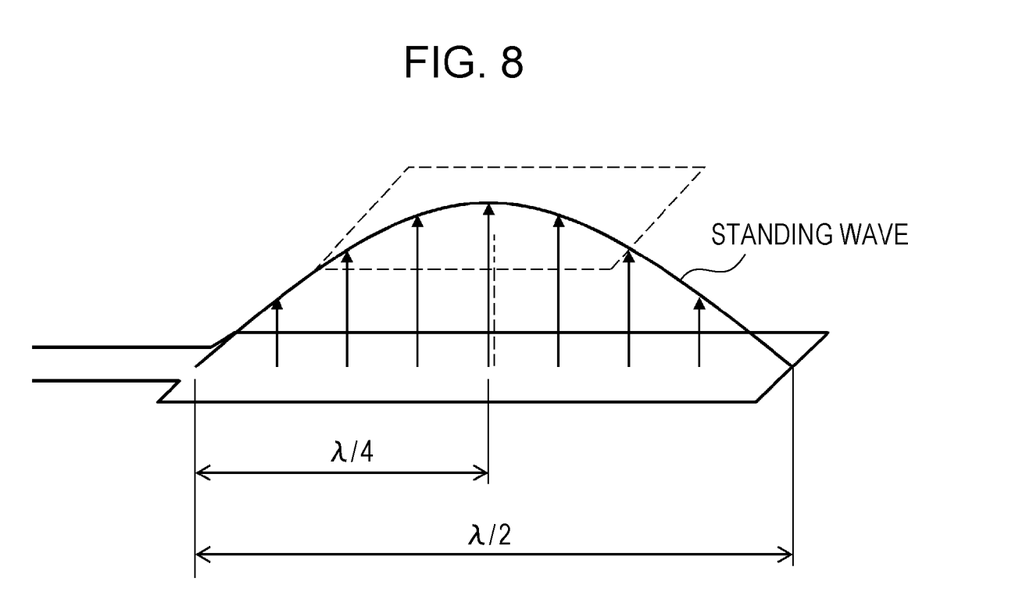
FIG. 8 is a diagram illustrating a state where a standing wave is generated on a stub in the high frequency coupler shown in FIG. 7.

Here, a signal output from the transmitting and receiving circuit via the signal line is reflected in the front end portion of the stub 73, and a standing wave is generated inside the stub 73. The phase length of the stub 73 is half the wavelength of the high frequency signal (180 degrees in terms of phase), and the signal line 74 and the stub 73 are formed by a microstrip line, a coplanar line, or the like on the print board 71. As shown in FIG. 8, when the front end is short-circuited at the phase length of the stub 73 which is half the wavelength, the voltage amplitude of the standing wave generated inside the stub 73 becomes 0 at the front end of the stub 73 and becomes maximal at the center of the stub 73, that is, a place corresponding to a fourth of the wavelength (90 degrees) from the front end of the stub 73. Around the center of the stub 73 at which the voltage amplitude of the standing wave becomes maximal, the stub 73 is connected to the coupling electrode 78 via the single terminal 77, thereby forming the high frequency coupler having good propagation efficiency.

The stub 73 shown in FIG. 7 is a microstrip line or a coplanar waveguide on the print board 71, which has a low DC resistance, thus has a small loss in the high frequency signal and can diminish the propagation loss between the high frequency couplers. Since the size of the stub 73 forming the distributed constant circuit is as large as about half the wavelength of the high frequency signal, an error in dimensions due to tolerance during manufacturing is slight as compared with the entire phase length, and thus characteristic differences are difficult to generate.

Next, an operation of securing the communication state by devices coming close to each other in the noncontact communication system will be observed. Here, it is assumed that a target point mark is added on the surface of each device, and a user targets the target point marks for the operation.

Figure 9:
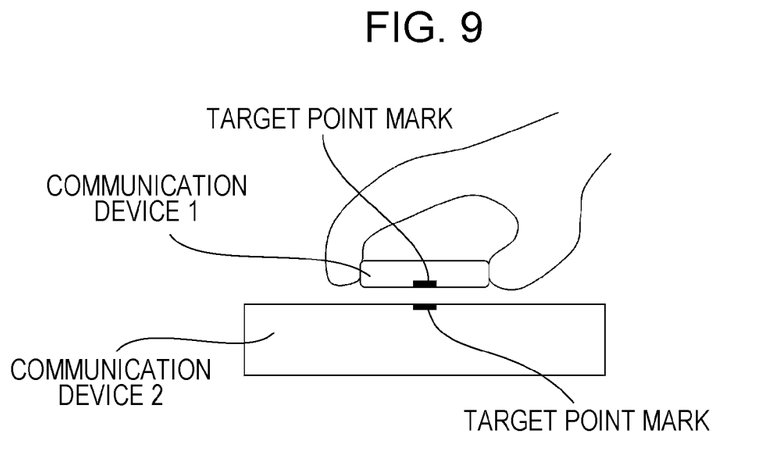
FIG. 9 is a diagram illustrating a state where a user makes devices coming close to each other targeting target points.

For example, if the user intends to obtain a proximate state by grasping one device and placing on the other device, when one device comes close thereto to a certain degree as shown in FIG. 9, the target point of the other device is hidden by the device grasped by the user or the user's hand grasping the device, and thus the position may not be confirmed visually.

Figure 10:
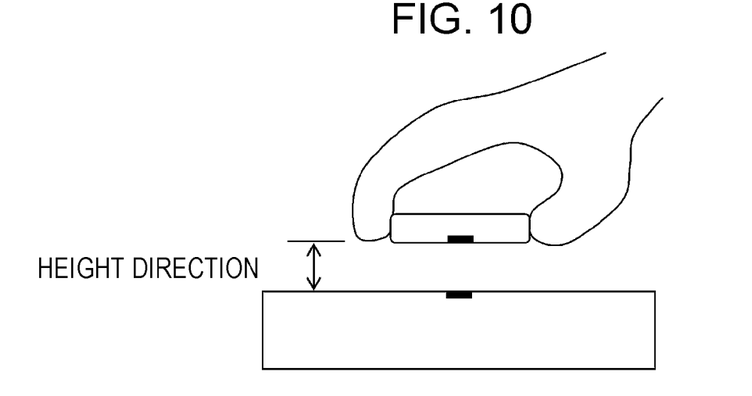
FIG. 10 is a diagram illustrating a state where the target points of the devices are not sufficiently close to each other.
Figure 11:
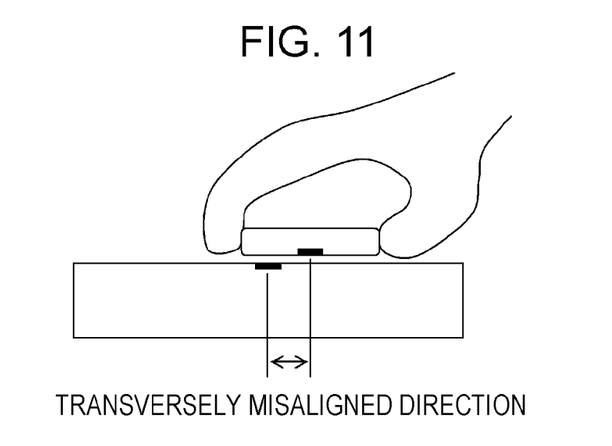
FIG. 11 is a diagram illustrating a state where the target points of the devices are not sufficiently close to each other.

Here, as the situation where the target points do not come close to each other, as shown in FIG. 10, there is a case where a gap between the target points is generated in the height direction, and, as shown in FIG. 11, there is a case where a gap is generated by being transversely misaligned.

Figure 12:
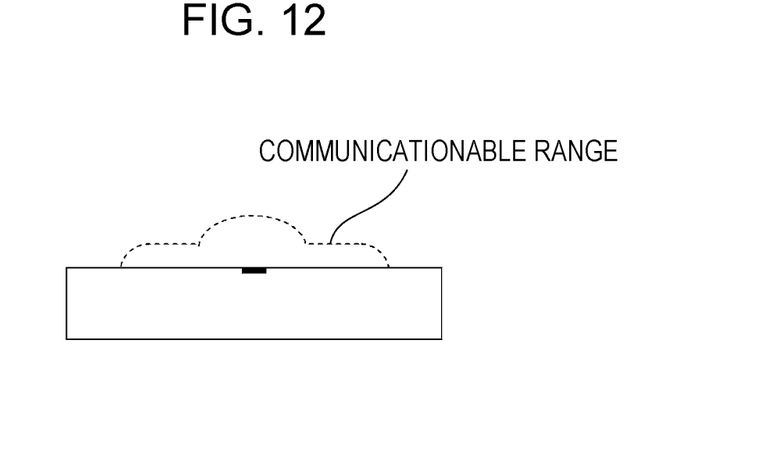
FIG. 12 is a diagram illustrating a communicationable range which is suitable for a user to adjust a position targeting the target points.

If assuming the situations as shown in FIGS. 10 and 11, the communicationable range of a device is expanded in the transverse direction with respect to the target point as marked with the dotted line in FIG. 12, and this may provide convenience to the user during use. Since in the communicationable range shown in the figure, the communicationable range in the longitudinal direction is expanded with a peak around the center of the target point, it is possible to obtain sharp operability where communication is stabilized around the target point.

In the proximity wireless transmission using the weak UWB, the longitudinal wave component $E_R$ of the electric field generated from the coupling electrode is mainly used. That is, when a large electric field is induced around the surface of the coupling electrode, the generated electric field is propagated from the surface of the coupling electrode, as an electric field signal of a longitudinal wave which oscillates in the progress direction (the direction of the microscopic dipole).

The longitudinal wave component $E_R$ of the electric field is expressed by the above-described equation (2). If an angle formed in the direction of the microscopic dipole is assumed to be $\theta$, the longitudinal wave component $E_R$ of the electric field is proportional to $\cos\theta$ and becomes maximal at the angle $\theta=0$. If a direction perpendicular to the front side of the coupling electrode is assumed to be $\theta=0$, the longitudinal wave component $E_R$ of the electric field generates the strongest electric field in the front side direction, and as the angle $\theta$ increases, it gradually becomes weaker. In the lateral direction, that is, at $\theta=90$ degrees, the longitudinal wave component $E_R$ becomes 0. The extent of the induction electric field (that is, the communicationable range) generated from the coupling electrode is as marked with the dotted line in FIG. 13.

On the other hand, in the electric wave communication method using an antenna, the transverse wave component $E_\theta$ of the electric field including the radiation electric field is mainly used. The transverse wave component $E_\theta$ of the electric field is expressed by the above-described equation (1). In the antenna, if an angle formed in a direction where a current flows is assumed to be $\theta$, the transverse wave component $E_\theta$ of the electric field generates the strongest electric field in the lateral direction, that is, at $\theta=90$ degrees, and gradually becomes weaker as the angle $\theta$ decreases. In the front side direction, that is, $\theta=0$ degree, the transverse wave component $E_\theta$ becomes 0. The extent of the radiation electromagnetic field (that is, the communicationable range) generated from the antenna is as marked with the dotted line in FIG. 14. As shown in the figure, the antenna radiating an electric wave can transmit to a relatively wide range, a signal which is almost non-directional inside a horizontal plane and is less attenuated according to a distance.

Figure 13:
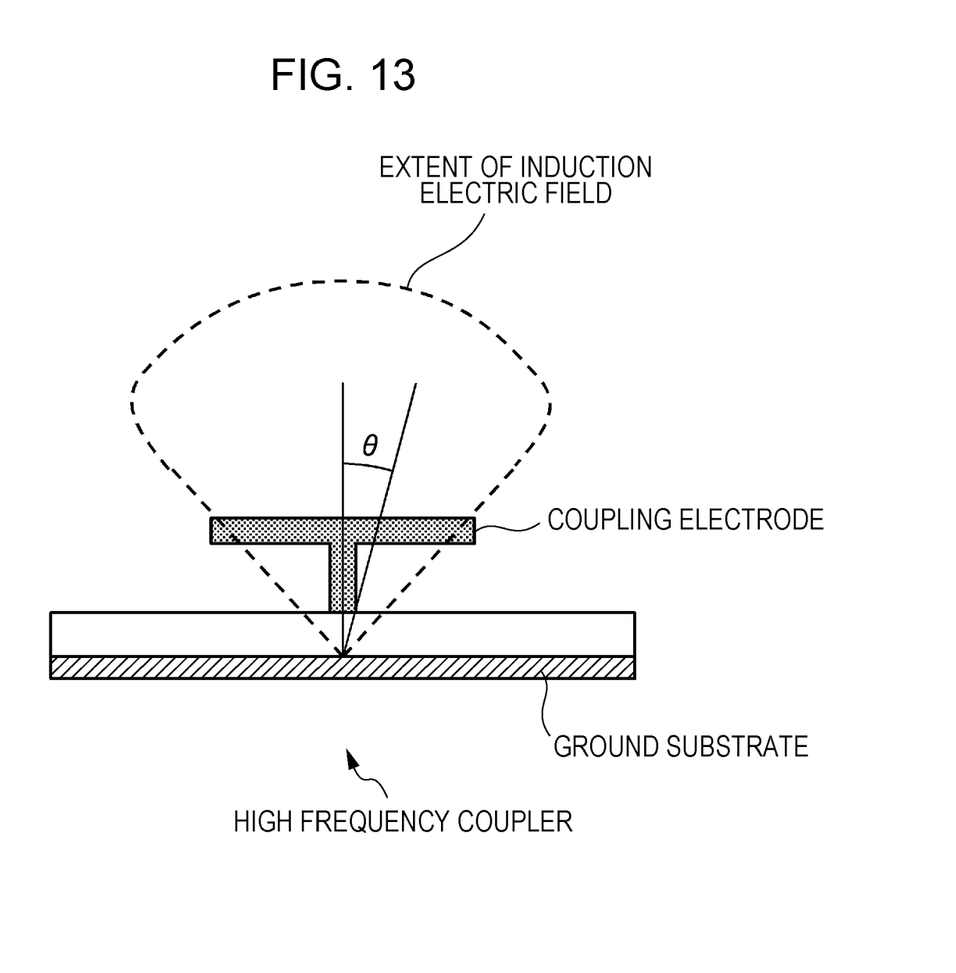
FIG. 13 is a diagram illustrating the extent of an induction electric field generated from the coupling electrode.
Figure 14:
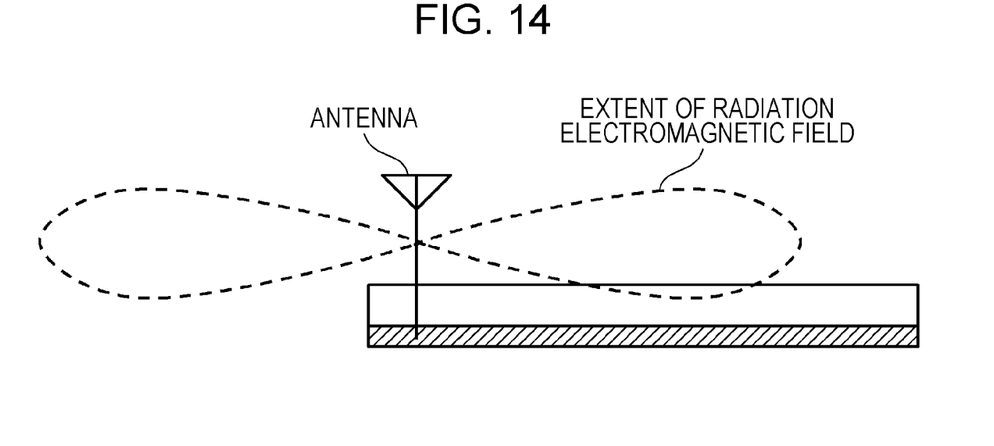
FIG. 14 is a diagram illustrating the extent of a radiation electromagnetic field generated from an antenna.

Therefore, the present inventor proposes a communication device in which the communicationable range through the coupling electrode as shown in FIG. 13 and the communicationable range through the antenna as shown in FIG. 14 are combined, in order to realize a communicationable range suitable for a user to adjust a position targeting the target point as shown in FIG. 12.

Figure 15:
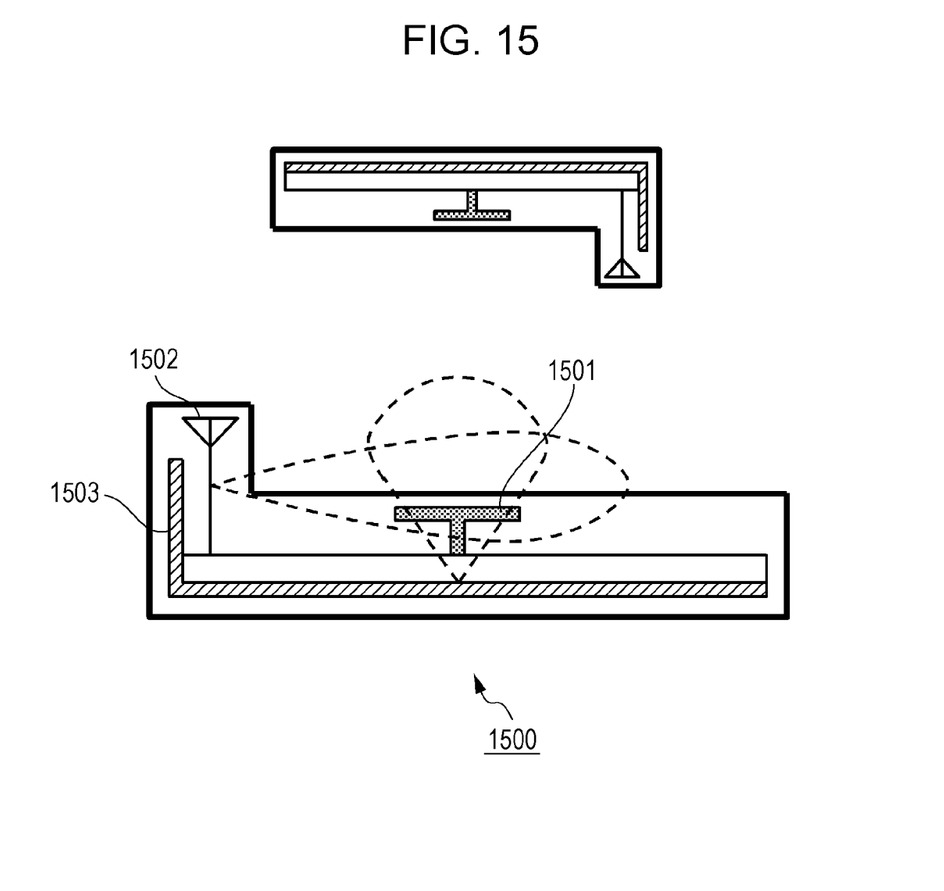
FIG. 15 is a diagram illustrating a configuration example of a communication device formed by combining a high frequency coupler and an antenna.

FIG. 15 shows a configuration example of a communication device 1500 where a high frequency coupler 1501 and an antenna 1502 are combined. The antenna 1502 is disposed spaced apart from a coupling electrode of the high frequency coupler 1501 with a predetermined interval, and a direction where a current flows into the antenna 1502 and a front side direction of the coupling electrode of the high frequency coupler 1501 are substantially parallel to each other. A reflection plate 1503 is installed in the rear side of the antenna 1502 such that an electric wave radiated from the antenna 1502 is concentrated in a desired direction, that is, towards the coupling electrode 1501 side.

If a direction perpendicular to the front side of the coupling electrode of the high frequency coupler 1501 is assumed to be $\theta=0$, the longitudinal wave component $E_R$ of the electric field radiated from the coupling electrode 1501 generates the strongest electric field in the front side direction, and gradually becomes weaker as the angle $\theta$ increases. In the lateral direction, that is, at $\theta=90$ degrees, the longitudinal wave component $E_R$ becomes 0. On the other hand, if an angle formed in a direction where a current flows into the antenna 1502 is assumed to be 0, the transverse wave component $E_\theta$ of the electric field radiated from the antenna generates the strongest electric field in the lateral direction, that is, at $\theta=90$ degrees, and gradually becomes weaker as the angle $\theta$ decreases. In the front side direction, that is, at $\theta=0$ degree, the transverse wave component $E_\theta$ becomes 0. If theses electric fields overlap each other, it is possible to obtain a communicationable range close to one shown in FIG. 12.

In the area where the extent of the induction electric field radiated from the high frequency coupler 1501 overlaps the extent of the radiation electromagnetic field radiated from the antenna 1502, the signals are mixed with each other, and thus it is necessary not to cancel each other out due to interference with each other.

Figure 16:
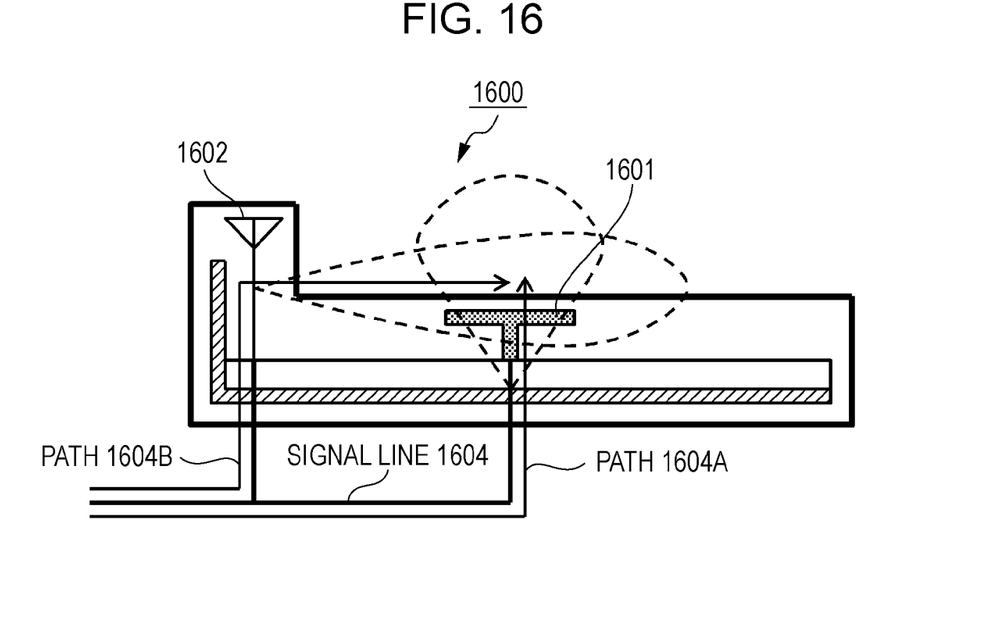
FIG. 16 is a diagram illustrating a configuration example of a communication device in which the total length of signals is adjusted such that a path for a signal radiated from a high frequency coupler and a path for a signal radiated from an antenna.

FIG. 16 shows a configuration example of a communication device 1600 where a high frequency coupler 1601 is combined with an antenna 1602 and which prevents interference of signals. A high frequency signal is input to each of the high frequency coupler 1601 and the antenna 1602 via a signal 1604. In the same figure, it is possible to prevent the interference by adjusting the total phase length of a signal for each path such that a path 1604A of a signal radiated from the high frequency coupler 1601 and a path 1604B of a signal radiated from the antenna 1602 are in phase.

Figure 17:
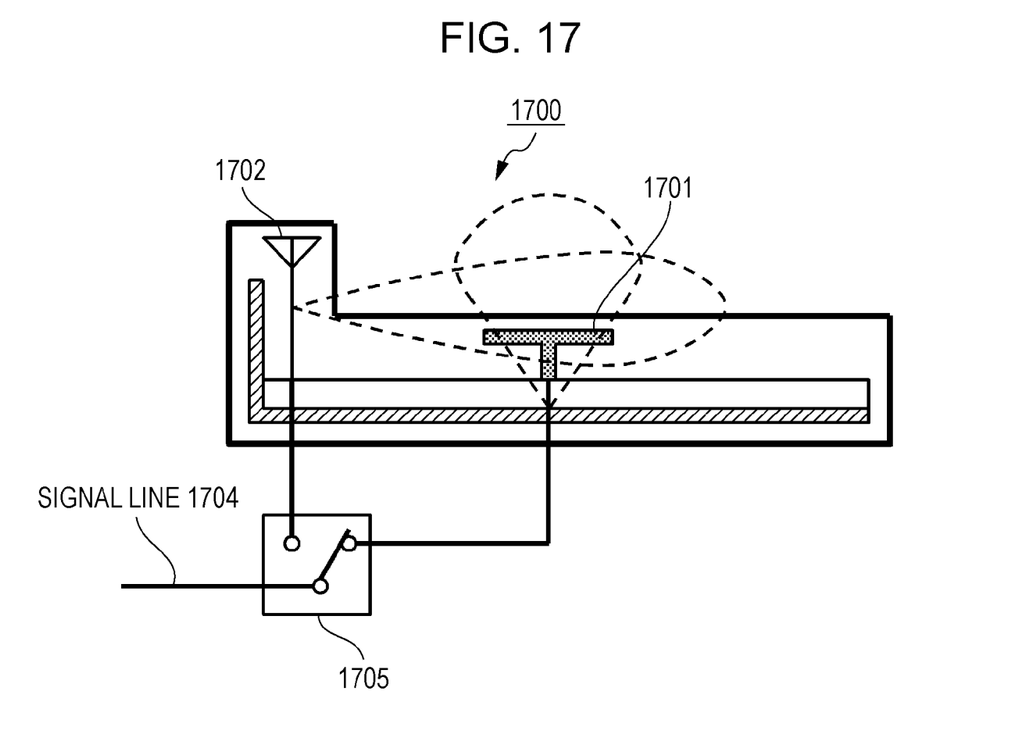
FIG. 17 is a diagram illustrating a configuration example of a communication device in which a high frequency coupler and an antenna constitutes a switch diversity using an RF switch.

Further, FIG. 17 shows another configuration example of a communication device 1700 where a high frequency coupler 1701 is combined with an antenna 1702 and prevents interference of signals. In the communication device 1700 shown in FIG. 17, a high frequency signal is input to each of the high frequency coupler 1701 and the antenna 1702 via a signal line 1704. An RF switch 1705 is inserted between the signal line 1704, and the high frequency coupler 1701 and the antenna 1702 constitutes a switch diversity which is switched by the RF switch 1705. A path having a better transmission state is determined, a switching signal is input to the RF switch 1705, and a signal is radiated from either the high frequency coupler 1701 or the antenna 1702. In other words, since the signal is radiated from the high frequency coupler 1701 or the antenna 1702, the signals are not mixed with each other, and thus it is possible to prevent interference. The transmission state can be determined based on, for example, an intensity of the received signal, packet error rate, or the like.

In the communication devices shown in FIGS. 15 to 17, the antenna which radiates a radiation electromagnetic field or an electric field signal may be "used for distant places" and the high frequency coupler which radiates a signal of an induction electric field may be "used for proximate places." In the communication devices shown in FIGS. 15 to 17, the antenna used for distant places and the high frequency coupler used for proximate places are respectively constituted by individual module components. In contrast, a single high frequency coupler has combined functions of radiating an induction electric field signal of a longitudinal wave and radiating a radiation electromagnetic field or an electric wave signal, and thus the antenna used for distant places and the high frequency coupler used for proximate places may be integrated in a single module as a modified example.

Figure 18:
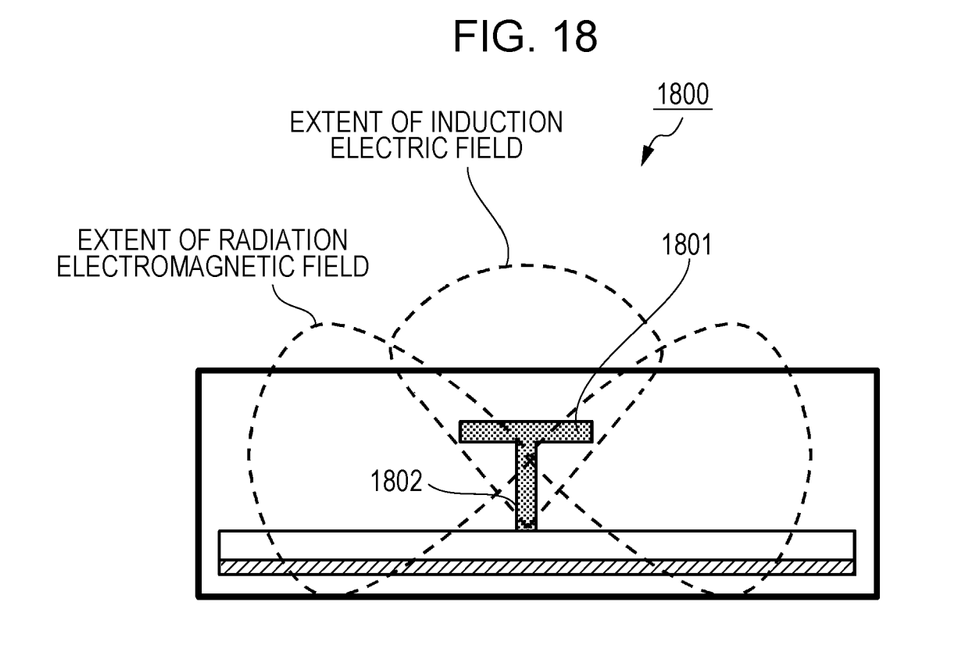
FIG. 18 is a diagram illustrating a state where a signal of an induction electric field is radiated from a coupling electrode of a high frequency coupler in a front side direction and a radiation electromagnetic field or an electric wave signal is radiated from a metal line supporting a coupling electrode in the transverse direction.

For example, the high frequency coupler has a structure similar to the structure of the capacity loaded antenna, as described with reference to FIG. 6. In order to suppress the action as the capacity loaded antenna, it is necessary for the coupling electrode to face the ground and to be installed at a position of being spaced apart from the ground with a height which can be disregarded with respect to the wavelength of a high frequency signal. In contrast therewith, in order to make the high frequency coupler to function as an antenna used for distant places, it is preferable that the coupling electrode faces the ground and is disposed spaced apart from the ground with a height which may not be disregarded with respect to the wavelength of the high frequency signal. In this case, the metal line supporting the coupling electrode works as an antenna and radiates a radiation electromagnetic field or an electric wave signal. FIG. 18 shows a configuration example of a communication device 1800 which is formed by a single module by substantially integrating the antenna used for distant places and the high frequency coupler used for proximate places. The figure shows that an induction electric field signal is radiated from a coupling electrode 1801 of the high frequency coupler 1800 in the front side direction and a radiation electromagnetic field or an electric wave signal is radiated from a metal line 1802 supporting the coupling electrode 1801 in the transverse direction. The metal line 1802 has a length for radiating the radiation electromagnetic field or the electric wave signal.

Moreover, the present inventor has confirmed that the coupling intensity increases if a metal having a specific shape is inserted between coupling electrodes of high frequency couplers communicating with each other. This is because the metal having a specific shape functions as an antenna, receives an induction electric field radiated from the coupling electrodes, and reradiates an electric wave.

Figure 19:
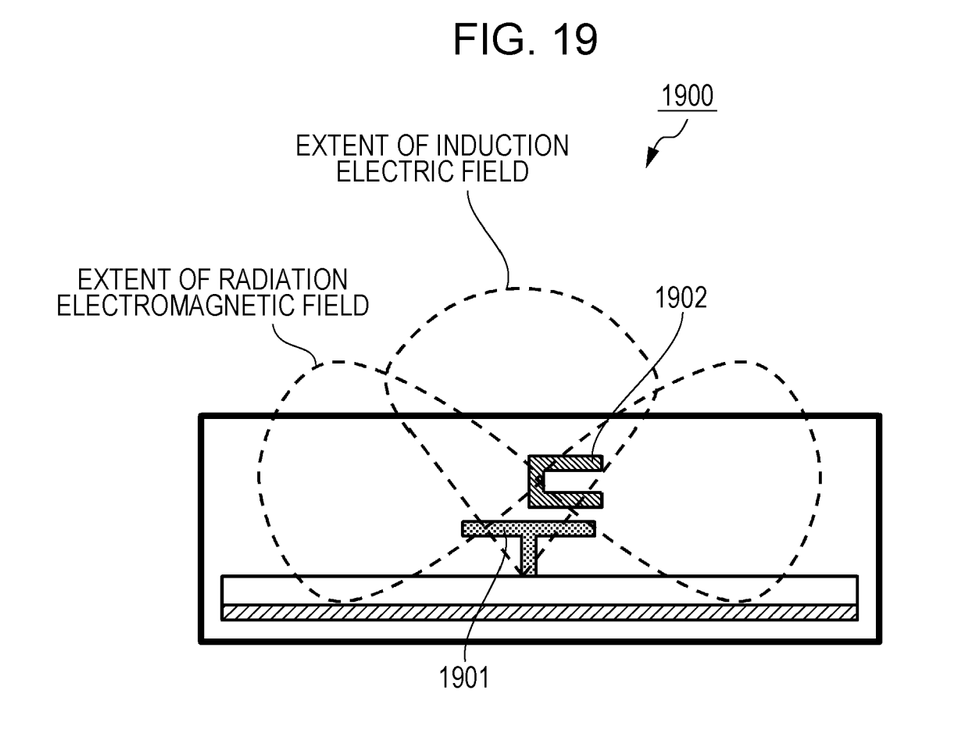
FIG. 19 is a diagram illustrating a configuration example of a communication device in which a metal piece working as a radiation element of an antenna is installed in front of a coupling electrode.

FIG. 19 shows a configuration example of a communication device 1900 which is formed by a single module by substantially integrating the antenna used for distant places and the high frequency coupler used for proximate places, using a re-radiation phenomenon of an electric wave through a metal piece. The figure shows the communication device 1900 which is formed by a single module by substantially integrating the antenna used for distant places and the high frequency coupler used for proximate places, by installing a metal piece 1902 functioning as a radiation element of the antenna in the front side direction (the radiation direction of the induction electric field) of the coupling electrode 1901. The induction electric field radiated from the coupling electrode 1901 induces a current inside the metal piece 1902. As a result, it is possible for the metal piece 1902 to indirectly radiate an electric wave.

Here, in order for the metal piece 1902 itself to work (resonate) independently as the radiation element of the antenna, the metal piece 1902 preferably has a size for resonance. Specifically, the metal piece 1902 may be formed to have a linear shape with a length of half the wavelength or a loop shape with a length of one wavelength (or integral multiple of the wavelength). According to the respective configurations, the metal piece 1902 can work as a half-wave dipole antenna and a loop antenna, respectively.

In addition, the coupling electrode 1901 is preferably installed at a position where resonance in the metal piece 1902 can be induced. If a strong induction electric field radiated from the coupling electrode 1901 reaches a part where the amplitude of a voltage when the metal piece resonates becomes maximal, it is possible to efficiently induce a current inside the metal piece 1902.

In the specification, although the description has been made mainly based on the embodiments in which the UWB signal is applied to the communication system which transmits data through the electric field coupling without cables, the gist of the present invention is not limited thereto. For example, the present invention is also applicable to a communication system using a high frequency signal other than the UWB communication method, or a communication system which transmits data through an electric field coupling using a relatively low frequency signal or through other electromagnetic actions.

The present application contains subject matter related to that disclosed in Japanese Priority Patent Application JP 2010-063052 filed in the Japan Patent Office on Mar. 18, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A communication device comprising:
a communication circuit unit that processes a high frequency signal which transmits data;

a high frequency signal transmission path that is connected to the communication circuit unit;

a high frequency coupler that receives the high frequency signal and radiates an induction electric field signal of a longitudinal wave; and an antenna that receives the high frequency signal and radiates a radiation electromagnetic field or an electric wave signal of a transverse wave, wherein the high frequency coupler includes:

a coupling electrode that is connected to one end of the high frequency signal transmission path and accumulates a charge;

a ground that is disposed to face the coupling electrode and accumulates a reflected image charge of the charge;

a resonance unit that increases a current flowing into the coupling electrode by installing the coupling electrode at a part where a voltage amplitude of a standing wave generated when the high frequency signal is supplied becomes great; and a support unit that is constituted by a metal line connected to the resonance unit at a nearly central position of the coupling electrode, wherein a microscopic dipole is formed by a line segment connecting a center of the charge accumulated in the coupling electrode to a center of the reflected image charge accumulated in the ground, and wherein the induction electric field signal of the longitudinal wave is output towards the high frequency coupler of a communication partner side which is disposed to face the coupling electrode such that an angle .theta. formed in a direction of the microscopic dipole becomes nearly 0 degrees.

2. The communication device according to claim 1, wherein the high frequency coupler mainly radiates the induction electric field signal of the longitudinal wave in a front side direction of the coupling electrode, and the antenna is disposed such that the radiation electromagnetic field or the electric wave signal of the transverse wave expands a communicable range of the high frequency coupler in a transverse direction.

3. The communication device according to claim 1, wherein in the high frequency signal transmission path, a total phase length of a signal for each path is adjusted such that a path for the induction electric field signal of the longitudinal wave and a path for the radiation electromagnetic field or the electric wave signal of the transverse wave radiated from the antenna are in phase.

4. The communication device according to claim 1, further comprising a switch that selectively connects the high frequency signal transmission path to either the high frequency coupler or the antenna, wherein a switch diversity is performed to connect to one, having a better transmission state, of the high frequency coupler or the antenna.

5. The communication device according to claim 1, wherein the antenna is formed by the metal line of the support unit having a length for radiating the radiation electromagnetic field or the electric wave signal.

6. The communication device according to claim 1, wherein the antenna is formed by a metal piece which is installed in a direction of the induction electric field radiated by the coupling electrode.

7. The communication device according to claim 6, wherein the metal piece is formed to have a linear shape with a length of half a wavelength of the high frequency signal or a length of half-integer multiple of the wavelength of the high frequency signal and itself resonates independently as the antenna.

8. The communication device according to claim 6, wherein the metal piece is formed to have a loop shape with a length of one wavelength of the high frequency signal or integral multiple of the wavelength of the high frequency signal and itself resonates independently as the antenna.

9. The communication device according to claim 6, wherein the metal piece is installed at a place such that a strong induction electric field radiated from the coupling electrode reaches a part where an amplitude of a voltage when the metal piece resonates becomes maximal.

10. A communication device comprising:

a communication circuit unit that processes a high frequency signal which transmits data;

a high frequency signal transmission path that is connected to the communication circuit unit;

a high frequency coupler that receives the high frequency signal and radiates an induction electric field signal of a longitudinal wave; and an antenna that receives the high frequency signal and radiates a radiation electromagnetic field or an electric wave signal of a transverse wave, wherein the high frequency coupler includes:

a coupling electrode that is connected to one end of the high frequency signal transmission path and accumulates a charge; and a ground that is disposed to face the coupling electrode and accumulates a reflected image charge of the charge, wherein a microscopic dipole is formed by a line segment connecting a center of the charge accumulated in the coupling electrode to a center of the reflected image charge accumulated in the ground, and wherein the induction electric field signal of the longitudinal wave is output towards the high frequency coupler of a communication partner side which is disposed to face the coupling electrode such that an angle (theta) formed in a direction of the microscopic dipole becomes nearly 0 degrees.

11. The communication device according to claim 10, wherein the high frequency coupler mainly radiates the induction electric field signal of the longitudinal wave in a front side direction of the coupling electrode, and the antenna is disposed such that the radiation electromagnetic field or the electric wave signal of the transverse wave expands a communicable range of the high frequency coupler in a transverse direction.

12. The communication device according to claim 10, further comprising a switch that selectively connects the high frequency signal transmission path to either the high frequency coupler or the antenna, wherein a switch diversity is performed to connect to one, having a better transmission state, of the high frequency coupler or the antenna.

13. The communication device according to claim 10, wherein the antenna is formed by a metal piece which is installed in a direction of the induction electric field radiated by the coupling electrode.

14. The communication device according to claim 13, wherein the metal piece is formed to have a linear shape with a length of half a wavelength of the high frequency signal or a length of half-integer multiple of the wavelength of the high frequency signal and itself resonates independently as the antenna.

15. The communication device according to claim 13, wherein the metal piece is formed to have a loop shape with a length of one wavelength of the high frequency signal or integral multiple of the wavelength of the high frequency signal and itself resonates independently as the antenna.

16. The communication device according to claim 13, wherein the metal piece is installed at a place such that a strong induction electric field radiated from the coupling electrode reaches a part where an amplitude of a voltage when the metal piece resonates becomes maximal.

17. A communication device comprising:
   a communication circuit unit that processes a high frequency signal which transmits data;
   a high frequency signal transmission path that is connected to the communication circuit unit;
   a high frequency coupler that receives the high frequency signal and radiates an induction electric field signal of a longitudinal wave; and
   an antenna that receives the high frequency signal and radiates a radiation electromagnetic field or an electric wave signal of a transverse wave,
   wherein the high frequency coupler includes:
      a resonance unit that increases a current flowing into a coupling electrode by installing the coupling electrode at a part where a voltage amplitude of a standing wave generated when the high frequency signal is supplied becomes great; and
      a support unit that is constituted by a metal line connected to the resonance unit at a nearly central position of the coupling electrode.

18. The communication device according to claim 17, wherein the antenna is formed by the metal line of the support unit having a length for radiating the radiation electromagnetic field or the electric wave signal.

* * * * *